No. 664,479. Patented Dec. 25, 1900.
G. F. HUGHSON.
FLEXIBLE JOINT FOR PIPES.
(Application filed Dec. 20, 1899. Renewed Nov. 8, 1900.)
(No Model.)
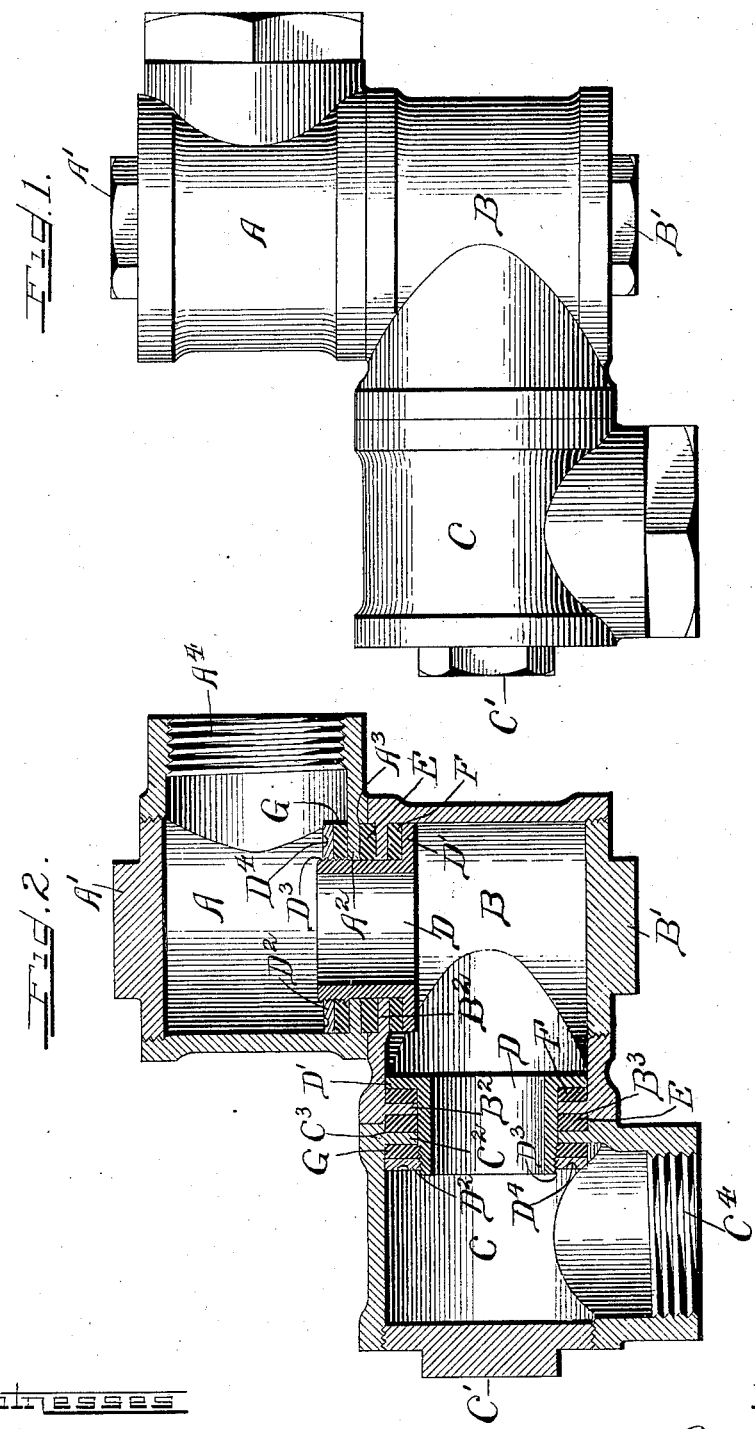
Witnesses
J B Weir
Ira C. Perry
Inventor
GEORGE F. HUGHSON.
by Luther L. Miller
Atty

UNITED STATES PATENT OFFICE.

GEORGE F. HUGHSON, OF CHICAGO, ILLINOIS.

FLEXIBLE JOINT FOR PIPES.

SPECIFICATION forming part of Letters Patent No. 664,479, dated December 25, 1900.

Application filed December 20, 1899. Renewed November 8, 1900. Serial No. 35,886. (No model.)

*To all whom it may concern:*

Be it known that I, GEORGE F. HUGHSON, a citizen of the United States, residing at Chicago, in the county of Cook and State of Illinois, have invented certain new and useful Improvements in Flexible Joints for Pipes, of which the following is a specification.

One object of this invention is the production of a joint for connecting the adjacent ends of two relatively movable pipes, so that a steam-tight or air-tight joint may be maintained between them, and also to make such joint so as to permit a universal movement of one pipe with relation to the other.

A further object of the invention is so to construct the joint that the pressure within the pipes will tend to hold the meeting faces of the parts together and, further, to provide a joint wherein no bolts are employed.

In the accompanying drawings, Figure 1 is a side elevation of a double joint, and Fig. 2 is a vertical central section through the same.

Like letters of reference indicate corresponding parts throughout both views.

In the construction of this joint I provide the three tubular members A, B, and C, one end of each of which is closed by the plugs A', B', and C', and which tubular members near their opposite ends are provided with the internal integral annular flanges $A^2$, $B^2$, and $C^2$, respectively.

$A^3$, $B^3$, and $C^3$ are annular recesses in the meeting faces of the tubular members A, B, and C, and the members A and C are provided with the internal screw-threads $A^4$ and $C^4$, adapted for the reception of the pipes of the system of which the joint is a part.

D is a tubular connecting-sleeve having the annular flange D' at one of its ends and is provided with the annular nut $D^2$, adapted to fit upon the screw-threads $D^3$, at the opposite end of said sleeve D. This nut has two diametrically opposite countersinks $D^4$ upon its outer face to permit of its being turned upon its screw-threads $D^3$.

E E are gaskets of any suitable material intended to lie between the meeting faces of the tubular members A, B, and C within the annular recesses $A^3$ and $B^3$ and $B^3$ and $C^3$.

F represents gaskets intended to lie in the space between the annular flange D' of the tubular connecting-sleeve D and the annular flanges $B^2$ of the member B.

G is a gasket intended to lie between the annular flanges $A^2$ and $C^2$ and the annular nuts $D^2$.

The joint herein shown and described is what is denominated a "double" joint—that is to say, it permits both vertical and lateral movements of the connecting-pipes. It is clear that the members A and C might be joined together in a similar manner, omitting the member B, and such arrangement is called a "single" joint, for in such a joint the connecting-pipes are limited to a hinge movement at their adjacent ends.

This joint is adapted for use for coupling pipes extending between a locomotive-engine and its tender or between two cars or coaches and is intended in that connection for either steam or air—the former for heating and the latter to operate the air-brakes. Its construction is such that the internal pressure preserves the tightness of the joint, even though the joint has become quite loose from wear.

I claim as my invention—

1. In a flexible joint for pipes, in combination, two members having coinciding fitting faces and contracted throats adjacent to said fitting faces; and a tubular sleeve adapted to lie within said contracted throats, and have an engagement with said members rearward of said throat portions, for holding the fitting faces together.

2. In a flexible joint for pipes, in combination, two members having coinciding fitting faces, each member being provided with an internal, annular flange; and a tubular connecting-sleeve for holding said faces together.

3. In a flexible joint for pipes, in combination, two members having coinciding fitting faces, each member being provided with an integral, internal, annular flange; and a tubular connecting-sleeve having an annular flange on one of its ends, and an annular nut on its other end, to hold said fitting faces together.

4. In a flexible joint for pipes, in combination, two members having coinciding fitting faces, with an annular recess in each of said faces; packing material for said recesses; each member also having an internal, annular flange; packing material for each of said flanges; and a tubular connecting-sleeve having an annular flange and an annular nut, to hold said fitting faces together.

5. In a flexible joint for pipes, in combination, three members having coinciding fitting faces with an annular recess in each of said fitting faces; two of said members being provided with an internal, annular flange; and the other member being provided with two internal, annular flanges; packing material for said recesses and for each of said annular flanges; and a tubular connecting-sleeve having an annular flange and an annular nut, to hold said fitting faces together.

GEORGE F. HUGHSON.

Witnesses:
L. L. MILLER,
FRED B. CHENEY.